March 10, 1953 S. MOREY ET AL 2,630,753
DEVICE FOR EXTRACTING JUICE
Filed June 30, 1948 8 Sheets-Sheet 1
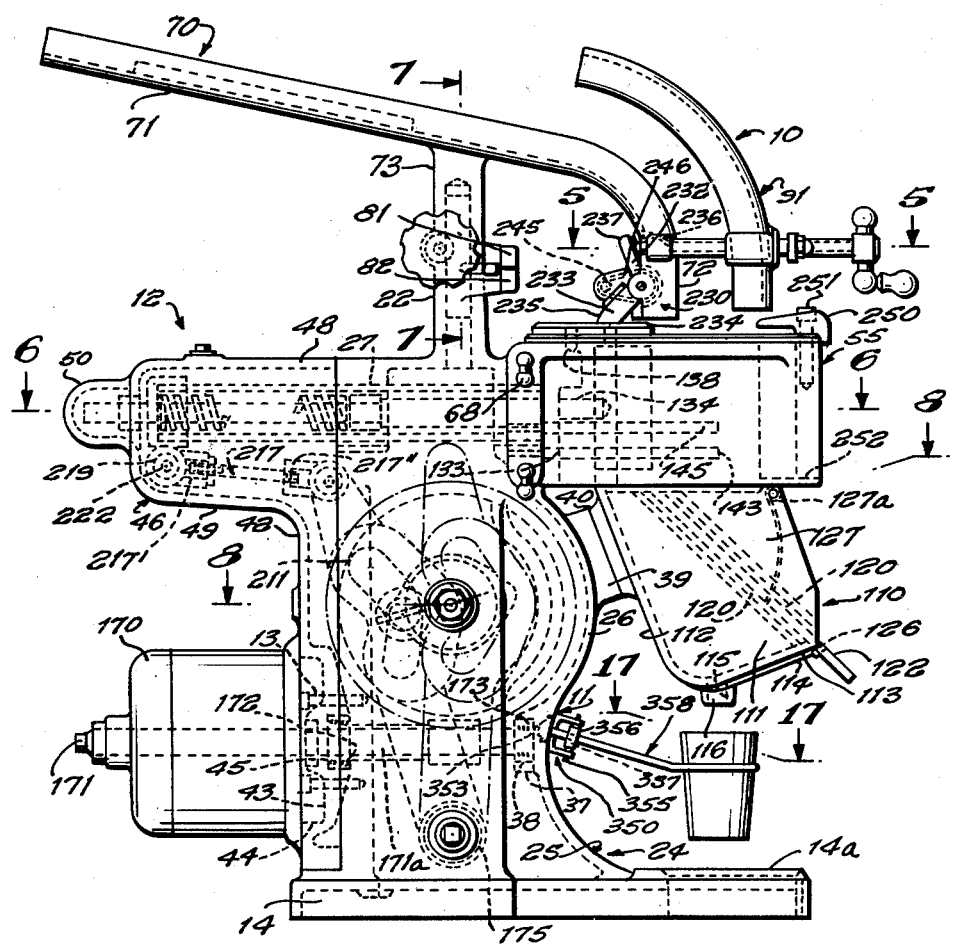
FIG. 1.
FIG. 17.
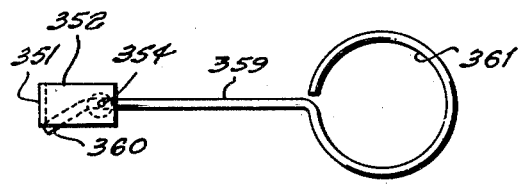
INVENTORS
Sigmund Morey and
Secondo Casoli
BY

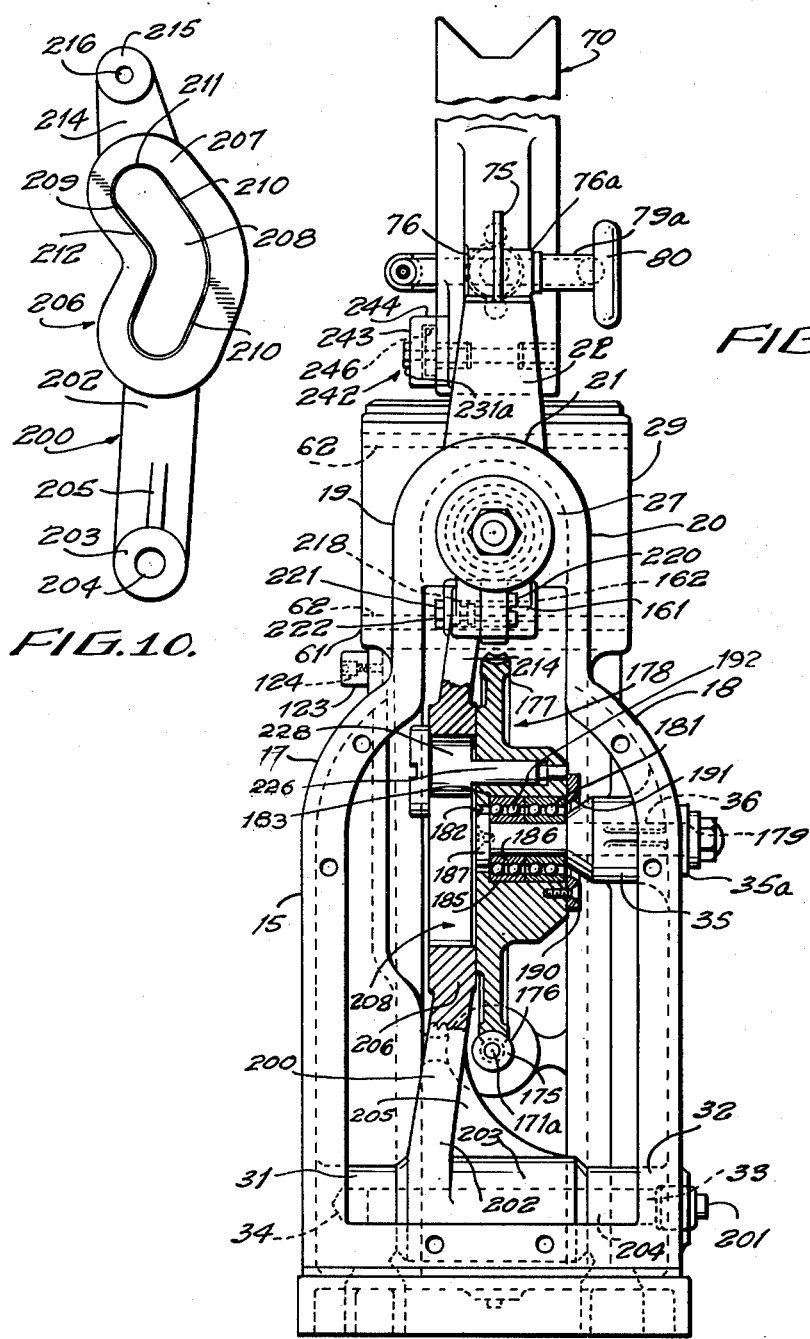

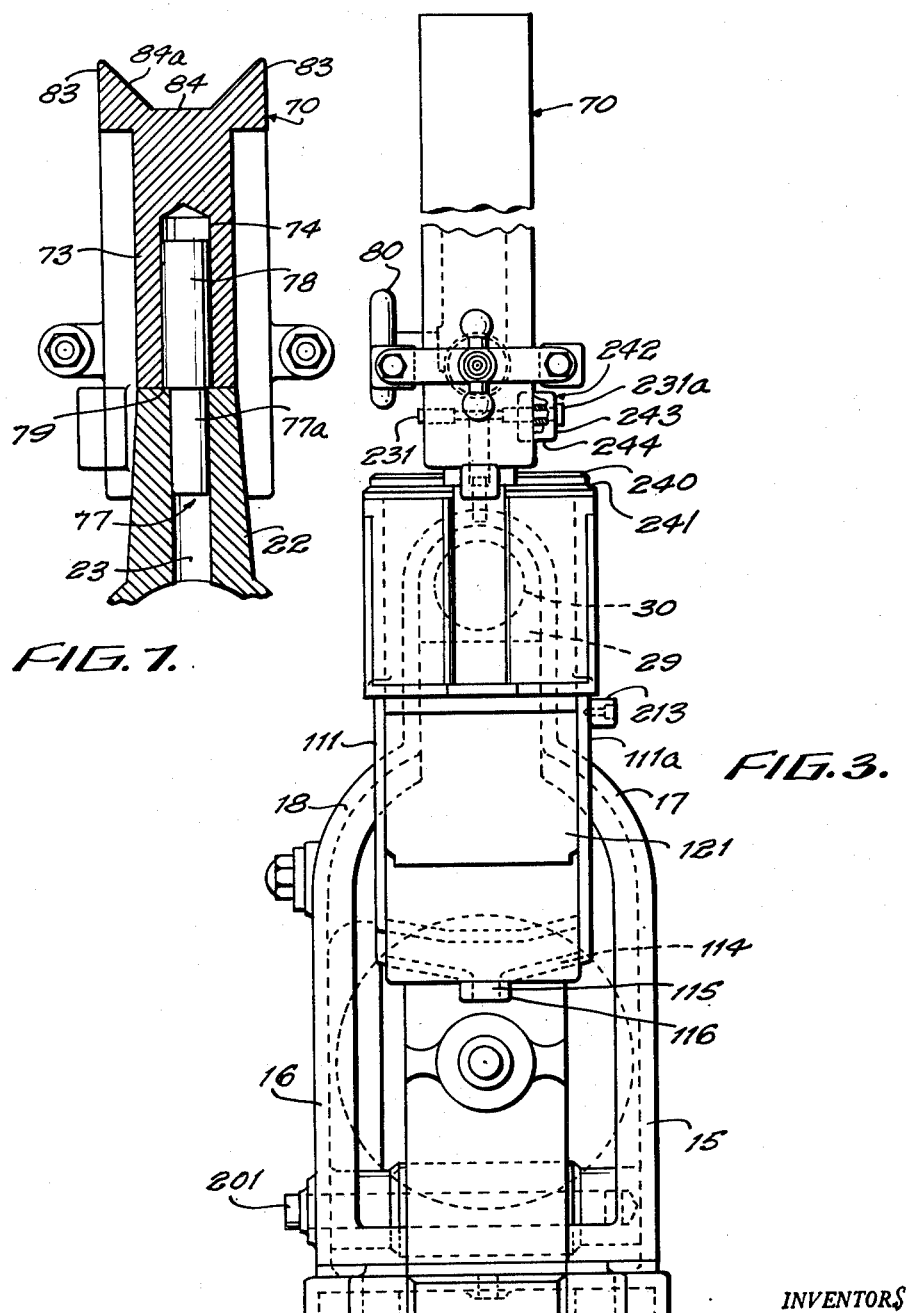

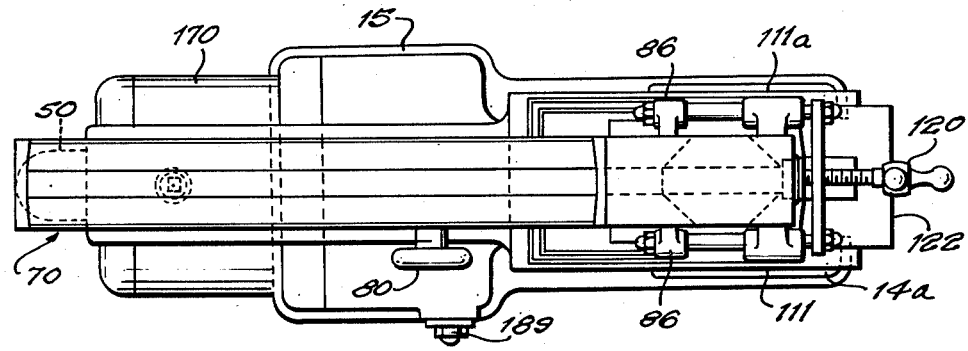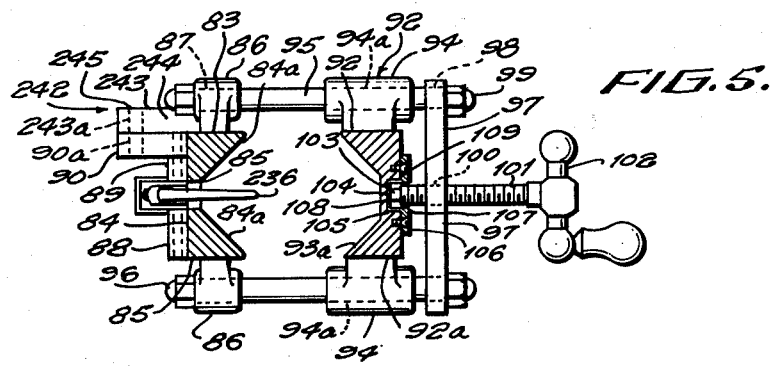

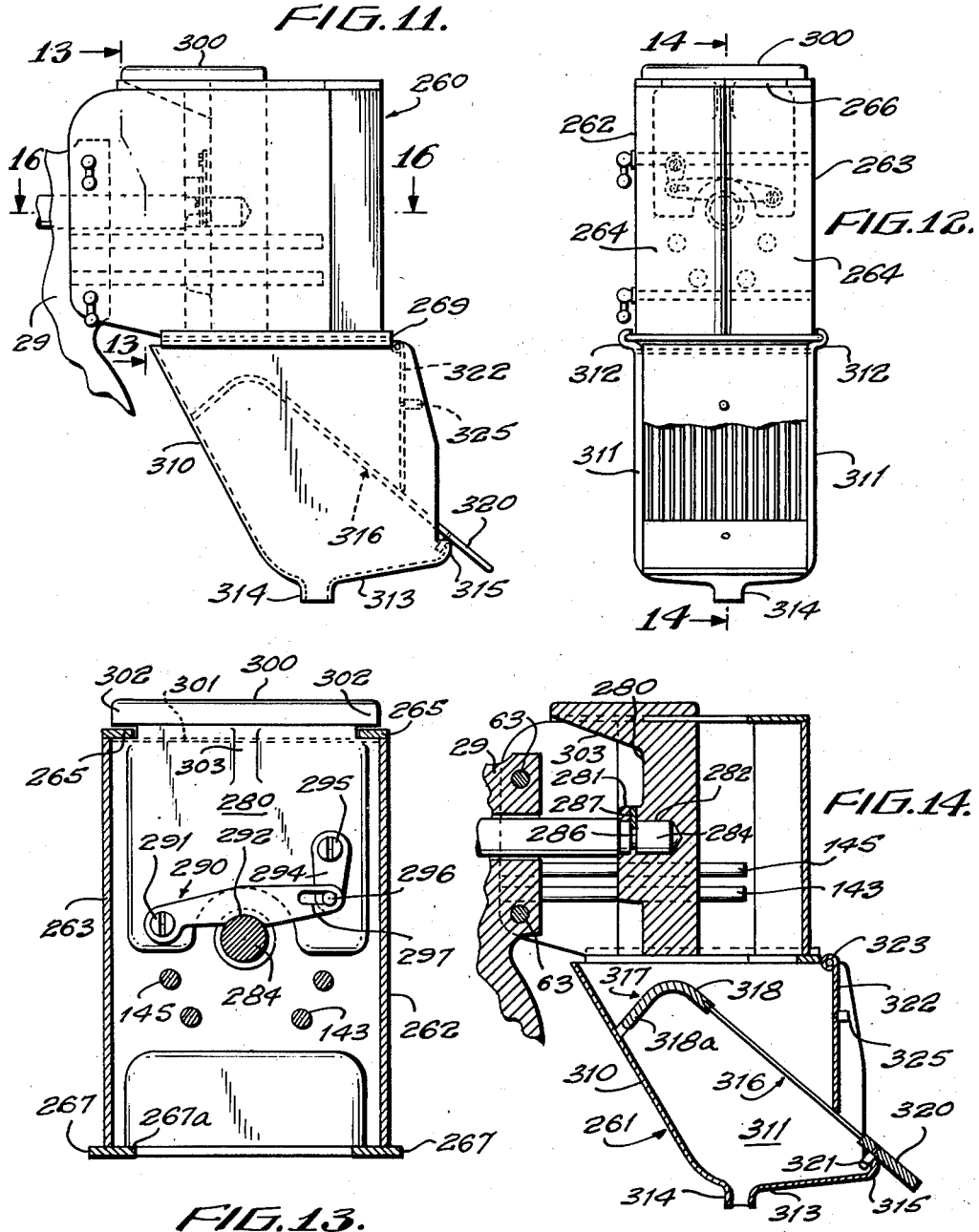

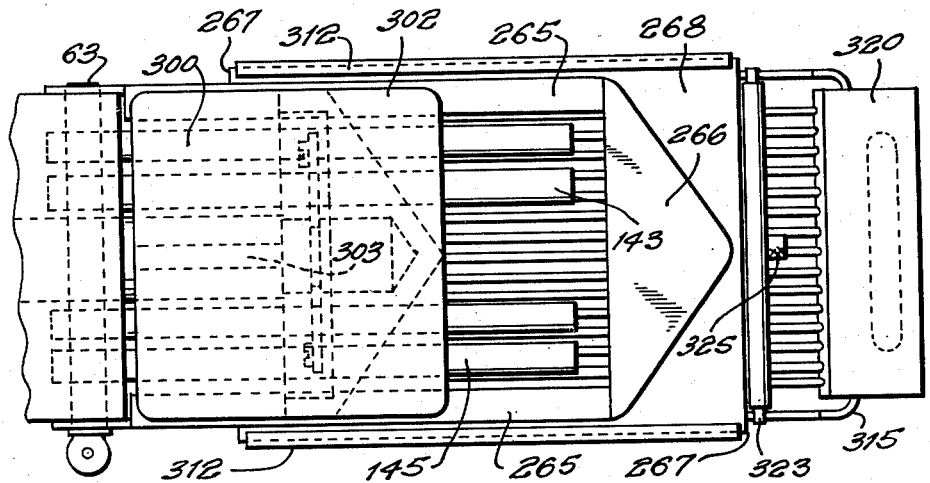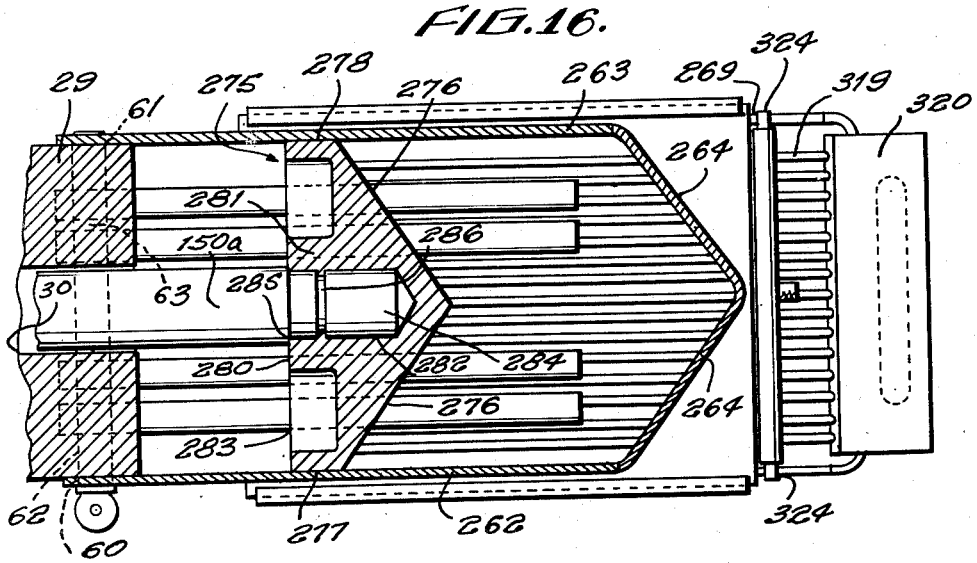

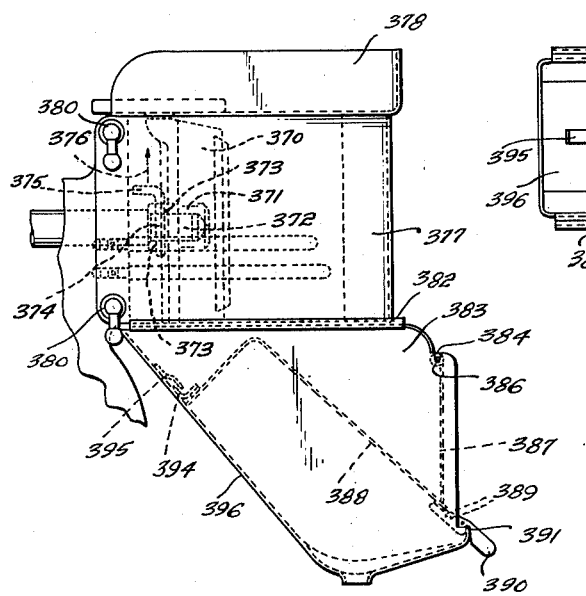
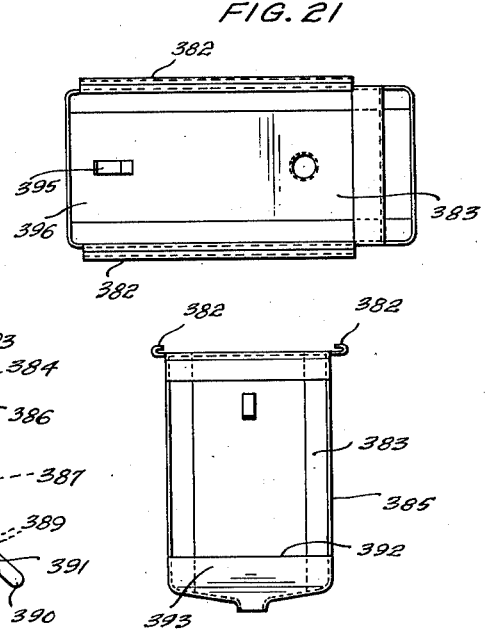
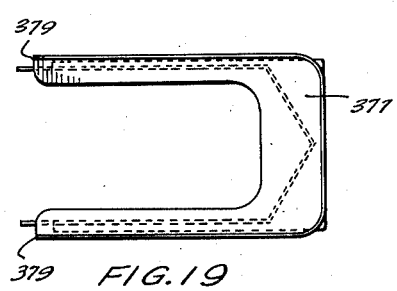
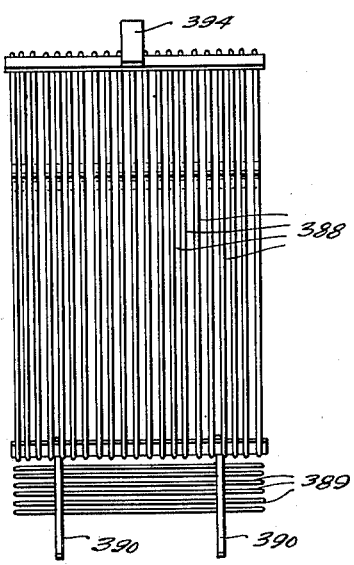
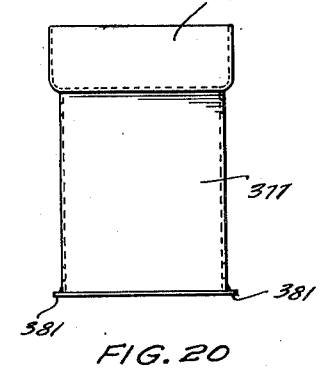

Patented Mar. 10, 1953

2,630,753

UNITED STATES PATENT OFFICE 2,630,753

DEVICE FOR EXTRACTING JUICE

Sigmund Morey and Secondo L. Casella, Astoria, N. Y., assignors to Morey Food Machinery Co. Inc., Astoria, N. Y.

Application June 30, 1948, Serial No. 36,005

5 Claims. (Cl. 100—127)

This application is a continuation-in-part of the U. S. patent application Serial No. 790,624, filed December 9, 1947, entitled "Juice Extracting Devices."

This invention relates to juice extracting devices, and more particularly to motor operated juicers which are adapted for continuous operation.

It is an object of this invention to provide a juice extracting device of the above type which can be easily dismantled for cleaning purposes.

It is another object of this invention to provide a device of this type which can be taken apart and reassembled by the operator of the device without necessity of any particular skill.

It is a further object of the present invention to provide in a juice extracting device strainer means of an entirely new construction which enable separation of the juice without any substantial loss of the same.

With the above objects in view, the present invention mainly consists in a juice extracting device comprising in combination a body member; a compression box having openings in its top wall, in its bottom wall and in one side wall; attaching means easily detachably attaching said compression box to said body member; a slidable compression member arranged within said compression box and slidable in a horizontal direction; an operating shaft arranged within said body member also slidable in a horizontal direction and projecting through an opening in said surface portion of said body member and through said opening in said side wall into said compression box; attaching means easily detachably attaching said compression member to the projecting end portion of said compression member to the projecting end portion of said operating shaft; a juice box provided with an opening in its top wall and arranged under said compression box with said opening in its top wall superimposed upon the opening in the bottom wall of said compression box; and means easily detachably attaching said juice box in such position to said compression box.

In accordance with a preferred embodiment of this invention, the new juice extracting device includes also an inclined strainer member easily removably arranged within said juice box; a juice outlet opening at the bottom of said juice box for removal of juice having passed through said strainer member; a relatively large outlet opening in the front wall of said juice box permitting the compressed solid parts of the extracted objects to leave said juice box after sliding down the inclined upper surface of said strainer member; and a door member freely turnably suspended near the upper front edge of said juice box so as to hang in vertical direction and to close in such position said relatively large outlet opening in said front wall of said juice box.

To enable fast dismantling and assembly of the extracting device according to the present invention, the attaching means for attaching the compression box to the body member and the attaching means for attaching the compression member to the operating shaft consist of an easily removed pin extending through a transverse hole in the compression member and shaft.

Furthermore, the attaching means for attaching the juice box to the compression box preferably consist of cooperating horizontal slot or groove and projection means arranged along two opposite lateral edges of the bottom wall of the compression box and the top wall of the juice box slidably attaching this juice box to the compression box.

Finally, the means for attaching the door member to the juice box are constructed so as to easily detachably suspend this door member to freely turn near the upper front edge of said juice box.

It should also be mentioned that the strainer member too, is easily removable; for this purpose, holding means are provided near the bottom of the strainer member enabling support of the same within said juice box in inclined position after it has been introduced into the same through said relatively large outlet opening.

The strainer member mentioned in the preceding paragraph is preferably provided with a plurality of parallel inclined strainer rods extending in longitudinal direction of the inclined strainer member from the upper end to nearly the lower front edge thereof, and a plurality of parallel horizontal strainer rods extending in transversal direction of the inclined strainer member near the lower front edge thereof.

The novel features which we consider as characteristic for our invention are set forth in particular in the appended claims. The invention itself, however, both as to its construction and its method of operation, together with additional objects and advantages thereof, will be best understood from the following description of specific embodiments when read in connection with the accompanying drawings, in which:

Figure 1 is a side view of the juice extracting device embodying the invention;

Fig. 2 is a rear view of the device embodying the invention with the rear housing thereof removed and with parts broken away and parts in section;

Fig. 3 is a front view of the device shown in Fig. 1;

Fig. 4 is a top plan view of the device shown in Fig. 1;

Fig. 5 is a cross sectional view taken on the line 5—5 of Fig. 1;

Fig. 6 is a cross sectional view taken on the line 6—6 of Fig. 1;

Figure 8:
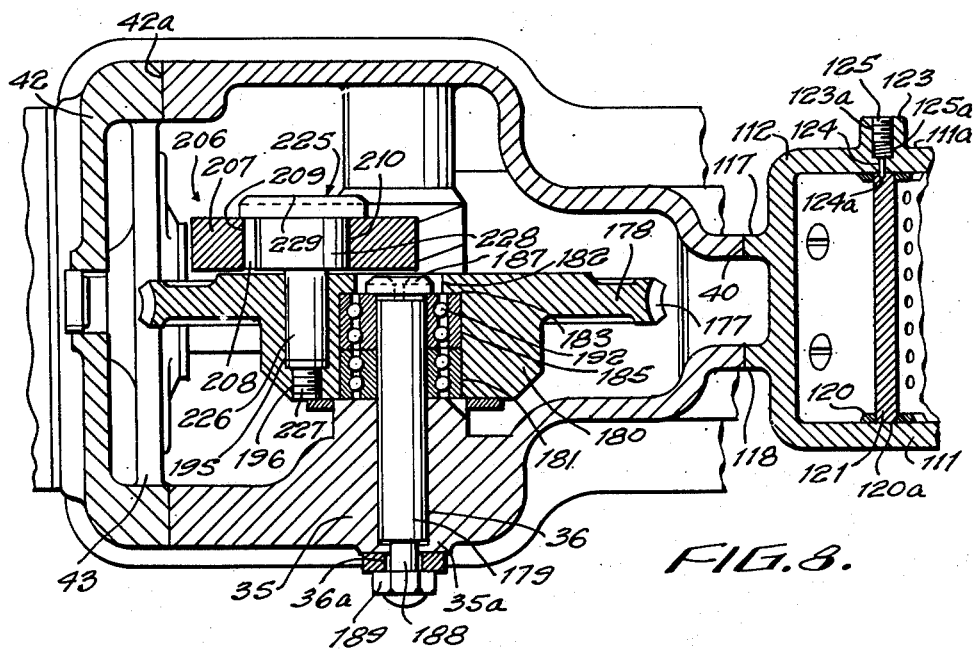
Figure 9:
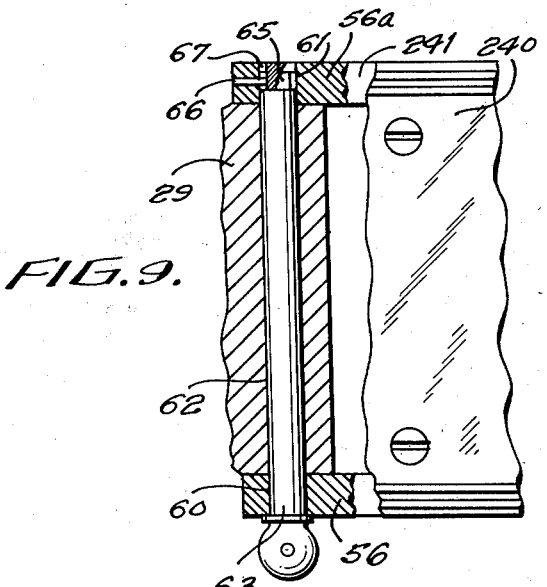

Fig. 6' is a cross sectional view through a modification of the device shown in Fig. 6;

Fig. 7 is a cross sectional view taken on the line 7—7 of Fig. 1;

Fig. 8 is a cross sectional view taken on the line 8—8 of Fig. 1;

Fig. 9 is a detailed view showing the attachment of the compression box to the front casing in the device embodying the invention;

Fig. 10 is an elevational view of a rocker arm comprising an element of the device embodying the invention;

Fig. 11 is a side elevational view of a compression box and juice box similar to that shown in Fig. 1 and illustrating a modification thereof;

Fig. 12 is an end elevational view thereof;

Fig. 13 is a sectional view taken on the line 13—13 of Fig. 11;

Fig. 14 is a sectional view taken on the line 14—14 of Fig. 12;

Fig. 15 is a top plan view of the structure shown in Fig. 11;

Fig. 16 is an enlarged sectional view taken on the line 16—16 of Fig. 11;

Fig. 17 is a top plan view of the drip receiving means shown in Fig. 1;

Fig. 18 is a side view of a compression box and juice box similar to that shown in Fig. 1 and illustrating a further modification thereof;

Fig. 19 is a top view of the compression box shown in Fig. 18;

Fig. 20 is a front view of the compression box shown in Figs. 19 and 20;

Fig. 21 is a top view of the juice box shown in Fig. 18;

Fig. 22 is a front view of the juice box shown in Fig. 21, seen in direction of arrow 22 of Fig. 21; and Fig. 23 is a top view of the inclined strainer shown in Fig. 18.

Referring now in detail to the drawing, 10 designates the juice extracting device embodying the invention. The same comprises a front housing 11 and a rear housing 12 suitably secured together by bolts 13. The front housing 11 comprises a base 14 which includes a forward portion 14a on its upper surface. Extending upwardly from a rear portion of the base 14 and spaced forwardly from the rear edge thereof are side walls 15, 16. Extending upwards from the side walls 15, 16 and converging towards each other are curved wall portions 17, 18, respectively. Extending from the curved wall portions 17, 18 are parallel, vertically extending walls 19, 20, respectively, which are interconnected by a curved top wall 21. Extending upwardly from a central portion of the top wall 21 is a bracket 22 which is formed with a vertically extending socket 23, for the purpose hereinafter appearing. The front ends of side walls 15, 16, and the curved portions 17, 18 extending therefrom, are interconnected by an upwardly extending, curved front wall 24. The wall 24 comprises a concave portion 25 at its lower end extending upwardly from the base 14 and a convex portion 26 at its upper end, interconnecting curved side walls 17, 18. The upper portion of walls 19, 20 and top wall 21 are interconnected at their rear edges by a wall 27 which is formed with a horizontally disposed through opening 28, see Fig. 6. The forward edges of walls 19, 20 and the top wall 21 are interconnected by a wall 29 which is formed with a horizontal through opening 30 aligned with opening 28. The wall 29 extends from the upper end of convex wall 26 and the edges thereof project outwardly of the walls 19, 20 and 21.

The side walls 15, 16 are formed with inwardly extending aligned bosses 31, 32, respectively, which are disposed at the lower front end of the walls. The boss 32 is formed with a through opening 33. The boss 31 is formed with a blind end opening 34 which is aligned with the opening 33. The curved wall 18 is formed with an inwardly extending elongated boss 35 disposed at a central portion of the lower end of the wall. The boss 35 is formed with a horizontally disposed bore 36 which is in vertical alignment with through opening 33. A boss 35a axially aligned with boss 35 extends outwardly of the wall 18. An opening 36a of reduced diameter extends from the bore 36, through the boss 35a.

The concave front wall 25 is formed with an inwardly extending boss 37 on a central portion thereof. The boss 37 is formed with a horizontally disposed blind end opening 38. Extending outwardly and upwardly of the convex wall 26, is an inclined boss 39 having an outer planar edge surface 40.

The rear housing 12 comprises a vertically extending wall 42 comprising flanged edge portions 42a which coincides as to shape with the rear edges of front housing 11 and abut the same. The bottom edge of wall 42 of housing 12 is disposed on the rear portion of base 14 and the rear housing is suitably bolted to the front housing 11. The wall 42 comprises a vertically disposed, offset wall portion 43 which forms a circular recess 44. The wall 43 is formed with a horizontally disposed through opening 45 which is aligned with opening 38 in the boss 37 on wall 25. Extending from the upper end of wall 42 is a rearwardly extending chambered portion 46 open at the forward end. The chambered portion 46 comprises side walls 47 interconnected by a curved top wall 48 and a downwardly inclined bottom wall 49 which merges at its forward end with wall 42. The forward edges of side walls 47 and top wall 48 abut the rear edges of walls 19, 20 and 21, respectively, of front housing 11. The rear edges of side walls 47, and top wall 48 and bottom wall 49 are interconnected by a pouch-shaped rearwardly projecting wall enclosure 50.

Removably mounted on the wall 29 and projecting forwardly thereof, is a compression box 55 which is open at its top and bottom and is adapted to receive fruit or other objects to be squeezed and juiced. The box 55 comprises side walls 56, 56a interconnected at their forward ends by a front wall 57. The front wall 57 comprises a thickened, outwardly projecting vertically disposed portion 58. The portion 58 is formed with a vertically extending slot 59 opening on the inside of the box 55 for the purpose hereinafter described. The side walls 56, 56a are formed with aligned transverse through openings 60, 61 on the rear end thereof adjacent the top edge. A similar pair of aligned transverse through openings 60, 61 are formed on the rear end of the walls 56, 56a, respectively, adjacent the bottom edge thereof. The wall 29 is formed with a pair of vertically aligned transverse through openings 62, each of which registers with the openings 60, 61 in box 55. A pair of pins 63, each of which extends through the registering openings in the box 55 and the wall 29 removably secures the box to the front housing 11. The pins 63 are formed at their outer ends with an annular groove 65. Lock pins 66 are mounted on the rear edges of side walls 56a of box 55 and extend transversely of and in communication with the openings 61 thereof. The ends of lock pins 66 project into the annular grooves 65 on pins 63 thereby normally preventing longitudinal movement of the pins. An end slot 67 is formed in the end of pins 63, which communicates with the annular groove 65. Upon rotating the pins 63 by means of handles 68 extending from the outer end thereof, the slotted portion 67 of the pins may be brought into registration with the lock pins 66. In this position, the pins 63 may be withdrawn longitudinally, thereby permitting removal of the box 55 from casing 11.

Removably and rotatably mounted on the bracket 22 is a chute 70 for feeding objects into the compression box 55. The chute 70 comprises a rearwardly extending upwardly inclined, elongated member 71, having a trough shaped groove on the upper face thereof. Extending from the forward end of the member 71 is a downwardly extending, curved extension 72, thereof, the end of which is disposed in spaced relation to the top of compression box 55. The extension 72 is formed with a groove which is a continuation of the groove in member 71. A bracket 73 extends downwardly from the under side of a forward portion of member 71. The bracket 73 is formed with a vertically extending socket 74. The rear wall of bracket 73 is split by a downwardly extending vertical slot 75 which communicates with the socket 74. At its lower end the split portions of the rear wall of bracket 73 are formed with aligned apertured and internally threaded ears 76, 76a. A stud 77 is vertically mounted in the bracket 22 on housing 11. The stud 77 comprises a lower portion 77a and an upper portion 78 of enlarged diameter forming an annular shoulder 79 which engage the upper end of bracket 22 as shown in Fig. 7. A threaded screw 79a having a knob 80 secured to one end thereof is screwed into the threaded openings in the aligned ears 76, 76a in bracket 73. The chute 70 may be moved vertically to a predetermined position by loosening the screw 79 and moving the chute 70 along stud 77 to the desired position and turning the screw 79a by means of the knob 80, in the appropriate direction, thereby contracting the split portion of the bracket 73, thereby locking the chute with respect to the stud portion 78. The chute 70 may also be rotated about stud 77, by loosening the split portions of the bracket 73 and moving the chute about the upper portion 78 of the stud, as an axis. An abutment member 81 extends horizontally from the lower end of bracket 73 and is engageable by an abutment member 82 which extends horizontally from the upper end of bracket 22. The abutment member 82 acts as a stop for the guide 70 as it rotates on stud 77, by engaging abutment member 81 on the bracket 73 of the guide. In this manner, guide 73 may be properly aligned so that its end portion 72 is disposed over a central portion of the compression box 55.

The curved portion 72 of chute 70 has a trough shaped groove corresponding to that of member 71 and comprises side walls 83, a bottom wall 84 and converging walls 84a extending from the upper end of side walls 83 toward the bottom wall 84. The bottom wall 84 is formed with a longitudinal slot 85 as shown in Fig. 5. The curved portion 72 of the chute 70 has bosses 86 extending outwardly of side walls 83. Each boss 86 is formed with a horizontal through opening 87. Extending rearwardly from the side wall 83 at the lower end of curved portion 72, are a pair of apertured ears 88, 89. Extending rearwardly from ear 89 is a triangular shaped wall 90 formed with a transverse opening 90a at its rear end.

A chute guide 91 is movably mounted on chute 70. The guide 91 comprises a curved member 92 which is complementary to the curved portion 72 of chute 70. The member 92 is formed with a trough shaped groove which is disposed in opposed relation to the trough shaped groove in chute portion 72, as shown in Fig. 5. The member 92 comprises side walls 92a, a bottom wall 93 and converging walls 93a extending from the upper end of side walls 92a towards bottom wall 93. Bosses 94 extend outwardly of the member and are formed with horizontal through openings 94a which are disposed in alignment with the openings 87 in bosses 86 on chute portion 72. A pair of shaft supports 95 having threaded end portions of reduced diameter are disposed in the aligned openings 87, 94a in the bosses 86, 94. Cap nuts 96 are screwed on to the rear ends of supports 95. A cross piece 97 formed with through openings 98 on opposite ends thereof is mounted on the front ends of the supports 95 and is secured in place by cap nuts 99 screwed on the threaded front ends of the supports. Slidable movement may be imparted to the guide chute 91 on the supports 95. To this end, the central portion of the cross piece 97 is formed with a threaded through opening 100. A screw 101 is disposed in the opening 100 and has a ball crank handle 102 secured to the front end thereof. The rear end of screw 101 is formed with a portion 103 of reduced diameter which extends into a recess portion 104 formed in the bottom wall 93 of the chute guide 92. A cap 105 is rotatably mounted within the recess 104 and is retained therein by means of a plate 106 screwed to the outer face of the wall 93. The plate 106 is formed with a through opening 107 which admits the end portion of screw 101. The cap 105 is formed with a through opening 108 which receives the portion 103 of reduced diameter of the screw 101. The end of the portion 103 is upset thereby riveting the screw 101 to the cap 105 with the upset portion of the screw received in an annular recess 109 formed on the rear of cap 105. It is apparent that by rotating the ball crank handle 102, the guide chute 91 may be moved towards and away from the chute 70 thereby forming a passage of varying size therebetween.

A juice box 110 is disposed in communicating relationship to the compression box 55, the width of the juice box being substantially equal to that of the compression box. The juice box 110 is open at the top and front portion and comprises a pair of side walls 111, 111a interconnected by an inclined back wall 112 and an upwardly inclined bottom wall 113. The bottom wall 113 comprises sections 114 inclined and converging toward each other. A drain opening 115 is formed at the intersection of the bottom sections 114 adjacent the lower end of back wall 112. The opening 115 is defined by a collar 116 extending downwardly from the bottom wall 113. A boss 117 extends rearwardly from the back wall 112. The boss 117 comprises an inclined outer planar edge 118 which abuts the edge 40 on the boss 39 on the front housing 11. The juice box 110 is suitably secured to front housing 11 with the edges of bosses 117 and 39, respectively, in contact. In this position the top edges of the side walls 111, 111a, of juice box are in contact with the bottom edges of the side walls 56, 56a, of the compression box 55.

The juice box 110 is provided with a strainer. To this end, each of the side walls 111, 111a is formed on its inner surface with a pair of parallel, elongated ribs 120 forming a groove 120a therebetween. The ribs are disposed at an angle and extend from the top edge of the side walls at a rear portion thereof, to the bottom edge of the side walls adjacent the front end of the bottom wall 113. The grooves 120a are aligned with each other and form a support for a perforated strainer plate 121, the lower end 122 of which projects beyond and below the bottom wall 113 of the juice box.

A boss 123 extends outwardly of the wall 111a at the upper edge and rear portion thereof. The boss 123 is formed with a threaded through opening 123a which communicates with an upper portion of groove 120a. A pin 124 is disposed in the opening 123 with its inner end engaging a recess 124a formed in a side edge of the strainer plate 121. A screw threaded plug 125 disposed in the boss 123 with a coil spring 125a interposed between the inner end of the plug and the head of the pin 124 maintains the pin in locking engagement with the strainer plate 121. A transverse pin 126 mounted on an opening in the lower portion of strainer plate 121 positions in plate against the front edge of bottom wall 113 of the juice box. A curved guard plate 127 is pivotally mounted on a rod 127a which extends between the side walls 111, 111a of the juice box 110 at the front thereof, the ends thereof being received in aligned openings in the side walls at the top edge thereof, as shown in Fig. 1.

Means is provided for cutting and squeezing fruit or other objects within the compression box 55. To this end, a plunger block 130 is slidably mounted for longitudinal movement within the compression box 55. The plunger block 130 comprises a front face 131 which is formed with a vertical slot 132 on its mid portion. The block is provided on its rear face 133, with a boss portion 134 which is formed with an axially extending, internally threaded recess 135. The block is further formed with a pair of horizontally aligned transverse through openings 136. The openings 136 are symmetrically disposed on either side of the vertical slot 132.

A second pair of horizontally aligned through openings 137 are also formed in the block 130, being disposed above openings 136. The openings 137 are also symmetrically disposed on either side of slot 132. The lower openings 136 are spaced closer together than the openings 137, for the purpose hereinafter appearing. The block is further formed with a vertical, internally threaded recess 138 extending downwardly from the top face thereof. A rectangular shaped cutting blade 140 is positioned within the vertical slot 132, with its cutting edge projecting forwardly into the compression box 55. The blade is fixed within the slot by means of suitable set screws 141 extending through appropriate openings in the edge of block 130.

Means is provided for supporting fruit within the compression box while it is being cut and squeezed by plunger block 130 and the cutting blade 140 mounted thereon. To this end, a pair of horizontally aligned rods 143 are mounted at their rear ends in blind openings 144 formed in the front face of wall 29 of front housing 11.

The rods 143 are symmetrically disposed with respect to the vertical median line of the front face of the wall 29. A second pair of horizontally aligned rods 145 are also mounted at their rear ends in opening 144a formed in the wall 29 and are symmetrically disposed with respect to the vertical median line of wall 29. The rods 145 are disposed above rods 143 and are spaced further apart than the rods 143. The rods 143 and 145 are locked into position by means of set screws 146 extending through appropriate openings in the edges of wall 29 and engaging annular grooves 147 formed in the rear ends of rods 143, 145. The forward ends of rods 143, 145 extend through the openings 136, 137 respectively, in the plunger block 130, permitting free movement of the block. The rods project into the compression box 55 towards the front wall 57, but terminate short of said wall. The rods 143 are adapted to support small objects while larger objects will be supported by the rods 145.

Means is provided for imparting reciprocal motion to the plunger block 130. To this end, a plunger shaft 150 having a threaded front end 151 is screwed into the threaded opening 135 in the plunger block. The shaft 150 comprises a rearwardly extending portion 152 of reduced diameter thereby forming a shoulder 153. The shaft 150 extends rearwardly through the opening 30 in wall 29 and opening 28 in wall 27 of front housing 11 and extends further, through the upper portion of rear housing 12 and terminates short of the end of the pouch-shaped walled enclosure 50. The shaft 150 is axially disposed within a tubular sleeve 155. The sleeve 155 comprises an externally threaded rear end portion 156 on which is screwed a cap 157. The cap 157 comprises an end wall 158 formed with an axial through opening 159 which admits the plunger shaft 150. The cap 157 further comprises an annular flanged wall 160 which is internally threaded and engages the threaded portion 156 of the sleeve 155. Extending downwardly from the wall 160 are a pair of ears 161 which are formed with aligned transverse openings 162. An annular collar 163 is mounted on the shaft portion 152 of reduced diameter abutting the shoulder 153. A helically coiled spring 165 having a predetermined compression point, beyond which its normal length is shortened, is mounted about the shaft portion 152, occupying the annular space between the shaft and the sleeve 155. The spring 165 is interposed between the collar 163 and the inside surface of end wall 158 of cap 157. A pair of hexagonal nuts 166 are screwed on the externally threaded end 167 of the shaft portion 152 with the inner nut normally abutting the outer face of wall 158 of the cap 157. The sleeve 155 is mounted for reciprocable movement in suitable bearings, positioned in the openings 28 and 30 in walls 27 and 29, respectively, in housing 11.

It will be apparent that forward movement of the sleeve 155 will cause the spring 165, which abuts the cap 157 on the sleeve at its rear end and at its front end, abuts the collar 163 engaging the shoulder 153 on shaft 150, to move the shaft 150 in a forward direction. The rearward movement of the sleeve 155 will cause the attached cap 157 which abuts the hexagonal nut 166 on shaft portion 152, to move the shaft 150 in a rearward direction. However, if resistance is offered to the forward movement of the shaft 150, as for example, by the presence of an incompressible object in the compression box 55, the shaft 150 will stop while sleeve 125 will compress the spring 165, providing the resistance is greater than the compression point of the spring. In this case, the rear end of the shaft portion 152 will extend through the opening 159 in the cap 157 while the sleeve 155 continues its forward movement. This avoids injury to the front wall 57 of the compression box as well as the block 130 and its associated actuating parts.

Means is provided for imparting movement to the plunger shaft 150 through the tubular sleeve 155 and its attached cap 157. To this end, an electric motor 170 is mounted in the recess 44 in the wall 42 of rear housing 12, being suitably bolted to the wall 43. The armature shaft 171 of the motor comprises an extension 171a thereof which extends horizontally through a bearing 172 mounted in opening 45 in wall 43 and projects into opening 38 on the wall 25 being supported in a bearing 173 mounted therein.

A worm gear 175 is suitably keyed to a forward portion of shaft extension 171a. The teeth 176 on worm gear 175 mesh with the teeth 177 on a worm wheel 178 rotatably mounted on a stud 179 mounted on the opening 36 in boss 35 extending from wall 18. The worm wheel comprises a thickened hub 180 which is formed with an axial annular recess 181 extending through a major portion of the thickness of the hub 180. The recess 181 extends towards the boss 35. The hub 180 is further formed with an axial through opening 182 which communicates with the recess 181 and has a diameter less than that of the recess 181 thereby forming a shoulder 183. A ball bearing is mounted within the recess 181. The bearing comprises an outer race 185 abutting the shoulder 183 and an inner race 186 receiving the shank of the stud 179, being disposed between the head of the stud and the projecting edge of the boss 35. The end 188 of the stud 179 which is of reduced diameter and is extremely threaded, projects through the opening 36a in the boss 35a and has a cap nut 189 screwed thereon, with the nut abutting the boss 35a. A circular plate 190 formed with an axial opening 191 is screwed to the face of the hub 180 with the projecting end of boss 35 passing through the opening 191. The plate 190 retains the outer ball bearing race 185 against axial movement. The usual balls 192 are disposed between the inner and outer races. The hub 180 of the worm wheel 178 is further formed with a transverse through bore 195 which includes an internally threaded end portion 196 of reduced diameter. The bore 195 is offset with respect to the axial recess 181.

Means is provided for interconnecting the cap 157 on the sleeve 155 with the worm wheel 178. To this end, a rocker arm 200 is mounted at its lower end on a shaft 201 which is suitably fixed in the openings 33, 34 in bosses 31, 32 on walls 15, 16, respectively. The rocker arm 200 comprises an upwardly and outwardly extending web 202 of substantially rectangular cross section and having a transversely extending boss 203 at its lower end. The boss 203 is formed with an axial through opening 204 in which is received the shaft 201. A substantially triangular shaped web section 205 extends transversely of the web 202, interconnecting the same with a top portion of the boss 203. Extending upwardly from the upper end of web 202 is a cam portion 206. The cam portion 206 comprises an endless wall 207 which defines an elbow shaped transversely disposed cam opening or slot 208 on the inner portion thereof. The opening 208 is defined by a portion including a pair of parallel straight surfaces 209, 210 interconnected by a semi-circular surface 211 at one end thereof, said opening being disposed above a horizontal median line. A similar portion is disposed below the median line, being angularly related to the portion above the line and in communication therewith. The surfaces 209 are interconnected by a convex surface 212 and the surfaces 210 are interconnected by a concave surface 213. This concave surface is arc-shaped and has the same curvature as the path of the outermost point of the cam follower 228. It extends over about 60° of the path of the cam follower, resulting in standstill of the rocker arm 200 while the cam follower 228 moves along this concave surface 213. Extending upwardly from the upper end of the cam portion 206 is a short web 214 which is formed at its upper end with a boss 215 provided with a transverse through opening 216. The arm 200 is pivotally interconnected to the cap 157 by means of an intermediate link 217 formed with transverse openings 218, at the ends thereof. A headed bolt 220 extends through the opening 216 in boss 215 of the arm 200 and through the opening 218 on one end of the link 217 with a nut 221 screwed thereon. The opposite end of the link is disposed between the ears 161 of the cap 157 with the opening 219 in registry with the transverse openings 162 in the ears. A pivot pin 222 extends through the registering openings and is suitably fixed with respect to the ears 161.

The above mentioned intermediate link 217 is actually composed of three portions, namely the two substantially sleeve-shaped screw threaded end portions 217' and 217'', and the connecting rod 217'''. This connecting rod 217''' is screw threaded along its both ends and engages the screw threaded holes within the two screw threaded end portions 217' and 217''. By these means it is possible to adjust the total length of the intermediate link 217 and to adjust thereby also the length of the stroke of the plunger block 130.

A cam follower roller 225 is disposed in the cam opening 208 of the rocker arm 200 and engages the worm wheel 178. The roller 225 comprises a shank 226 having extending from one end thereof an externally threaded portion of reduced diameter 227 which is screwed into the threaded portion 196 in the hub 180 of the worm wheel. Extending from the other end of shank 226 is an annular roller portion 228 of enlarged diameter which is disposed within the cam portion 206 of the rocker arm 200. Extending from the outer surface of the roller portion 228 is an annular head 229 of enlarged diameter which spans the opposite walls 207 of the cam opening 208.

It is apparent that upon energizing the motor 170, the rotation of the armature shaft 171 will cause the worm 175 thereon to impart rotary motion to the worm wheel 178. The rotation of the worm wheel 178 will cause the cam follower roller 225 mounted thereon, to move within the cam opening 208 of the rocker arm 200 thereby imparting rocking movement to the arm about the shaft 201 as an axis. The rocking movement of the arm 201 will impart reciprocating movement to the sleeve 155 through the interconnecting link 217 and cap 157, thereby moving the shaft 150 and the attached plunger block 130. As mentioned above, the particular shape of the concave surface 213 of the cam slot 208 will result in periodic standstill of the rocker arm 200 which, in turn, will result in periodic standstill of shaft 150 and the attached plunger block 130. These periods of standstill will occur due to the particular arrangement of the parts of the new machine at those moments when the plunger block is in its forward compressing position. Thus, the compressed fruits will be subjected to extended compression periods during which the juice is completely extracted.

Means is provided for regulating the movement of fruit along the chute 70. To this end, an oscillatory trigger in apertured ears 88, 89 extends from the portion of the chute 70. The trigger 230 comprises an upwardly extending arm 232 and a downwardly and rearwardly extending arm 233 angularly related to arm 232. The arm 233 is formed with a horizontal bottom edge 234. A stop plate 235, having side portions projecting on either side of arm 233, is fixed to the rear of the arm and is adapted to abut the bottom wall 84 of chute portion 72 upon movement of the trigger 230 in a counterclockwise direction. The upper end of trigger arm 232 has affixed thereto a curved prong 236 by means of a nut 237 screwed onto the threaded rear end of the prong. The fore portion of the prong 236 is adapted to move through the slot 85 in the bottom wall 84 of the chute portion 72 upon movement of the trigger 230 in a clockwise direction. The bottom edge 234 of the arm 233 is normally disposed in contact with the top face of a plate 240 secured to the top face of the plunger block 130 by screws received in the openings 138 therein. The side edges of the bottom face of the plate 240 are in slidable contact with liner strips 241 secured to the top edges of the side walls 56, 56a of the compression box 55.

Means is provided for insuring the restoration of the trigger 230 to its normal position after it has been rotated in a clockwise direction due to the forward movement of plunger block 130 and the plate 240. To this end, a substantially triangular shaped chambered cover member 242 is mounted on the chute portion 72 abutting the triangular shaped wall 90. The member 242 comprises a vertical wall 243 and a peripheral flanged wall 244 extending therefrom and contacting the wall 90. The rear end of pivot pin 231 extends across the cover 242 and projects through an appropriate opening in the wall 243 and has a collar 231a fixed thereto. A stud 245 is fixed in the opening 90a in wall 90 and an aligned opening 243a in the wall 243. The stud 245 is in horizontal alignment with the pin 231 with the end suitably secured to the pin. It is apparent that upon clockwise movement of the trigger 230, the windings of spring 246 will tighten about the pivot pin. When the clockwise movement of the trigger 230 ceases, the spring will tend to unwind thereby imparting counterclockwise movement to the trigger, thereby restoring it to its normal position.

An aligning finger 250 is secured to the top edge of the projecting portion 58 of the front wall 57 of the compression box 55, by means of a screw 251 received in an appropriate threaded blind opening in the projection 58. The finger 250 is aligned with the slot 59 and is adapted to properly position the bottom end of the guide 91.

The aligning finger 250 is further adapted to overlie and contact the upper surface of plate 240 which is secured to the top face of the block 130, when the block is in its forward, compressing position. The finger 250 will thus keep the block 130 from moving upwardly during its forward movement towards wall 57 of the compression box.

A closure plate 252 is secured to the bottom face of the projection 58 on the front wall 57 of the compression box 55 thereby closing off the bottom of the slot 59.

In operating the device 10, fruit, vegetables, or the like of predetermined size are fed successively to the chute 70 along portion 71 thereof. The chute guide 91 is adjusted with respect to the chute portion 72 by turning the ball crank handle 102 in the appropriate direction. The adjustment of the guide 91 is made in accordance with the size of the fruit to be processed and insures smooth feeding of the moving fruit which passes between the inclined walls 84a of the chute portion 72 and the opposed inclined walls 93a of the guide 91 downwardly into the compression box 55. The fruit is received on the supporting rods 143, 145 which cradle the fruit regardless of size within the compression box. Upon energizing the motor 170, the shaft 150 is moved forwardly through its interconnection to sleeve 155, cap 157 and spring 165. The plunger block 130 on the shaft 150 will move forwardly with the knife blade 140 on the block cutting the fruit in half. Simultaneously, the cut fruit will be squeezed between the front face 131 of the block 130 and the front wall 57 of the compression box, with the forward edge of the blade 140 being received in the vertical slot 59 in the wall 57. The juice squeezed from the fruit will go through the strainer plate 121 and will pass into the juice box 110 where it will be directed by the converging sections 114 of the bottom wall 113 to the outlet 115 where it may be collected in a container, not shown, suitably positioned on the forward portion 14a of base 14. The squeezed hulls of the fruit will move down the inclined strainer plate 121 and will pass the pivoted guard plate 127, moving it outwardly about its pivot pin 127a. The hulls may be collected in a suitable container or by other means, not shown.

It will be apparent that the squeezed hulls will be of reduced size and, accordingly, will drop downwardly between the forward ends of the support rods 143, 145 and the inner face of front wall 57. The ends of the rods 143, 145 will act as stop members to prevent the squeezed hulls from moving rearwardly within the compression box 55 due to a tendency for the hulls to adhere to a slight extent to the cutting blade 140 or the front face 131 of the plunger block 130. The hulls will continue their downward movement until they contact the inclined strainer plate 121 in the juice box 110.

While the block 130 is in its forward compressing position, the trigger 230 will be rotated in a counter-clockwise direction since the bottom edge 234 of the trigger arm 233 is no longer in contact with the plate 240 on the block and is urged by the action of the clock spring 246. In this position, the curved prong 236 will be in its rearward position and, therefore, out of the path of the fruit moving between chute portion 72 and guide 91. Accordingly, another fruit may drop onto the plate 240 preparatory to being dropped into compression box 55 to be squeezed upon the retracted movement of the block 130. When the block returns to its rearward position, the trigger 230 is rotated in a clockwise direction bringing the curved prong 236 into its forward position thereby supporting the fruit above the prong and preventing downward movement thereof until the next forward movement of the block 130.

It will be noted that the shape of the cam opening 208 in the rocker arm 200 provides for alternate fast and slow movement of the reciprocating shaft 150. As the cam follower roller 228 approaches and leaves the angular portion of the opening 208 as defined by the surfaces 212, 213, the speed of movement of the shaft 150 is relatively low. When the roller 228 moves towards the end surfaces 211 of the opening 208, the movement of the shaft 150 is accelerated. It follows from a consideration of Fig. 1 that the shaft will be relatively slow moving at the rearmost and foremost positions and relatively fast moving intermediate these positions. This is particularly desirable when the shaft 150 is at its foremost position where the object within the compression box 55 is being squeezed by the block 130 on the shaft 150, against the front wall 57 of the compression box. In this position the movement of the block is of an order that provides a slight hesitation or dwell. This insures efficient extraction of the juice from the body being squeezed. The retraction of the block 130 is at a relatively higher speed, as the roller 228 moves away from the angular portions of the cam opening 208. The speed of movement of the block is again slowed down as the shaft 150 reaches its rearmost position preparatory to change in direction of movement and accompanying acceleration in speed in its consequent forward movement.

In the event that an object is encountered in the compression box 55 which offers undue resistance to the movement of the plunger block 130, the shaft 150 will stop while sleeve 155 will compress the spring 165. The compressive point of the spring is such as to permit stopping of the shaft 150 upon a predetermined degree of resistance to the forward movement of the block offered by the object within the compression box 55.

The chute 70 may be readily removed from the housing 11 by lifting it upwardly together with the stud 77, which is mounted on the bracket 22. The chute 70 may also be rotated by means of the stud 77 about the bracket thereby bringing the chute portion 72 into and out of its position with respect to the top of juice box 55.

In Figs. 11 to 16 is shown a compression box 260 and attached juice box 261, similar to the compression box 55 and juice box 110, previously described, except as hereinafter described and illustrating a modification thereof.

The compression box 260, open at its rear, top and bottom, comprises a pair of side walls 262, 263 interconnected at their front ends by a pair of forwardly converging front walls 264. Extending inwardly from the upper edge of each of the side walls 262, 263 is a longitudinal, horizontally disposed strip 265. A triangular shaped top wall 266 interconnects the upper edges of the front walls 264, with the forward ends of strips 265 abutting the same. Disposed in contact with the lower edges of the side walls 262, 263 are longitudinally extending flanges 267. The flanges 267, which project outwardly of the walls 262, 263 and also comprise a portion 267a projecting inwardly of the walls, extend forwardly of the forward ends of the side walls and slightly beyond the apex portion of front walls 264. The forward portions of flanges 267 are interconnected by a horizontal plate portion 268 having a forwardly disposed transverse edge 269.

The compression box 260 is removably secured to the wall 29 of front housing 11 by means of transverse pins 63, passing through openings 60, 61 in walls 262, 263 which register with openings 62 in wall 29, in the manner previously described.

A plunger block 275 is slidably mounted for longitudinal movement within the compression box 260, with its bottom side edges in contact with flange portions 267a. The block 275 comprises a pair of diverging rectangular shaped front faces 276 which complement the V-shaped front walls 264 of the compression box. Extending rearwardly from the outer ends of faces 276 are parallel side faces 277, 278 in slidable contact with the inner surfaces of side walls 262, 263 of compression box 260. The block 275 further comprises a vertical back face 280 disposed inwardly of the rear edges of the side faces 277, 278. A boss 281 extends rearwardly from a central portion of rear face 280. The boss 281 is formed with an inwardly extending axial blind end recess 282 for the purpose hereinafter appearing. The block 275 is further formed with a set of four horizontally disposed through openings 283 symmetrically disposed with respect to the axis of recess 282, as shown in Fig. 13.

Means is provided for reciprocating block 275 within the compression box 260. To this end, a plunger shaft 150a, which is connected at its rear end to the operating mechanism illustrated in detail in Figs. 1 and 2, is detachably attached at its front end to the block. The plunger shaft 150a extends rearwardly through the opening 30 in wall 29 and has a forward portion 284 of reduced diameter projecting into recess 282 and forming a shoulder 285 which abuts the outer face of boss 281. The shaft portion 284 is formed with an annular groove 286. The upper portion of the boss 281 is formed with a slot 287 extending parallel to the back face 280 of the block. The slot 287 communicates at its lower end with the recess 282.

Means is provided for releasably locking shaft 150a to the plunger block 275. To this end, a latch 290 is pivotally mounted at one end by means of pivot screw 291 on back face 280 of the block, adjacent the side face 278 of the block. The latch 290 extends through slot 287 in the boss 281 and is formed with an arcuate portion 292 on its bottom edge. The arcuate edge portion 292 is aligned with the shaft portion 284 and is adapted to be disposed within the annular groove 286 when the latch is in its normal position, thereby preventing longitudinal rearward movement of the shaft 150a with respect to block 275. A short arm 294 is pivotally mounted at one end thereof by means of a pivot screw 295, on the back face 280 of the block, adjacent side face 277 of the block. A pin 296 extends outwardly of the free end of arm 294 and is disposed in a horizontal slot 297 formed in the free end of latch 290. To disengage shaft 150a from block 275, it is only necessary to move arm 294 in a clockwise direction about pivot pin 295, which will cause latch 290 to be lifted upwardly, thereby disengaging the arcuate edge 292 of the latch from the groove 286 in the shaft portion 284 of shaft 150a.

The through openings 283 in block 275 admit the fruit support rods 143, 145 which are secured at their inner ends to the wall 29 in the manner previously described, their outer ends terminating short of the walls 264 of the compression box to leave a space therebetween.

The block 275 comprises a rectangular shaped top plate 300 extending from the top face of the block rearwardly of back face 299 of the block and forwardly to the apex portion of the converging front faces 276 of the block. The plate 300 is connected to the top of block 275 by a neck portion 301 and extending between the strips 265. The side edges 302 of the plate 300 overlie the strips 265, as shown in Fig. 13. The undersurface of a rear portion of plate 300 is connected to the back face 299 of the block by a web 303. The groove formed by the neck 301, and the side edges 302 of the plate 300, receiving the inwardly projecting portions of strips 265, permit slidable movement of the block 275 while preventing upward movement thereof. When the block is in the forward position, the front portion of plate 300 will be disposed over the top plate 266 of the compression box.

The juice box 261 which is open at the top and front comprises a downwardly and forwardly inclined back wall 310 from which extends a pair of side walls 311. The side walls 311 are formed with inturned curved edges 312 at their upper ends, said curved edges slidably engaging the flanges 267 on the bottom of the side walls of the compression box 260 whereby to removably position the juice box on the compression box. The juice box further comprises a bottom wall 313 slightly inclined upwardly and forwardly, interconnecting the lower ends of side walls 311 and the back wall 310. The bottom wall 313 is formed with a centrally disposed spout opening 314 adjacent the back wall 310. The forward edge of the bottom wall 313 comprises an upturned transverse portion 315. A strainer member 316 is removably mounted within the juice box 261. The same comprises a bent plate 317 extending between the side walls 311 of the juice box. The plate 317 comprises portions 318, 318a at right angles to each other. Secured to the edge of portion 318 are the ends of a plurality of spaced parallel wires or rods 319. The other ends of the wires or rods 319 are anchored in the rear edge of a rectangular plate 320. A transverse pin 321 extends downwardly from a central portion of plate 320 and is adapted to engage an inner portion of the upturned edge 315 on bottom wall 313 of the juice box. The edge of the other angle portion 318a of the plate 317 abuts an upper portion of the back wall 310 of the juice box. In this position, the wires or rods 319 are disposed in a diagonal position relative to the upper edges of the box. A rectangular guard plate 322 extends between the side walls 311 of the juice box, being pivotally mounted for outward movement at its upper edge on a transverse pivot pin 323 removably disposed in aligned notches 324 formed in the forward upper ends of side walls 311. The lower edge of the plate 322 may abut the wires 319 of the strainer 316 when the plate is in its normal vertical position. A stud 325 is mounted on the plate 322 for moving the same.

It is noted that the side walls 262, 263 of the compression box have their top edges somewhat higher than the top edges of the compression box 55 relative to the upper edge of wall 29 as shown in Fig. 1, in order to accommodate the lock plate 300. Accordingly, the chute 70 which feeds the fruit to the compression box, may be raised to a suitable position, in the manner previously described.

The construction shown in Figs. 11 to 16 facilitates the removal of juice box 261 from compression box 260, for cleaning or the like. Similarly, the strainer 316 and the plunger block 275 may be readily removed for cleaning or the like. Also, the converging faces 276 on the plunger block 275 are highly effective in compressing the objects fed into the compression box against the walls 264 to express the juice therefrom, having the squeezed objects free to fall downwardly between the ends of support rods 143, 145 and the walls 264 to the strainer 316 where they are guided through the movable guard plate 322 to the outside of the juice box.

In Fig. 18, a modified arrangement is shown in which the plunger block 370 is provided with a sleeve-shaped metallic member 371 firmly embedded in the rear face thereof. At the front end of the shaft 150, a shaft portion 372 having a decreased diameter is provided so as to fit into the sleeve-shaped metallic member 371. Holes 373 are provided in opposite walls of this sleeve-shaped member and a corresponding hole 374 is provided in the shaft portion 372. In order to secure the plunger block 370 to the shaft 150, the sleeve-shaped member 371 is slid on the shaft portion 372 and a pin 375 is inserted through the holes 373 and 374, firmly attaching the plunger block to the shaft. It is evident that in this arrangement it is very easy to detach the plunger block from the shaft for cleaning purposes by pulling pin 375 in direction of arrow 376 out of the holes 373 and 374.

In the modified arrangement shown in Fig. 18 a modified compression box of the type shown in Figs. 19 and 20, a modified juice box of the type shown in Figs. 21 and 22, and a modified strainer of the type shown in Fig. 23 are employed.

The modified compression box 377 is provided on its top with an upwardly extending projecting rim 378 as shown in Figs. 18 to 20. The box itself is provided near its rear edge 379 with transversal holes 380 which correspond to transversal holes in the body of the juicer. Through these holes, pins can be inserted in order to hold the compression box in properly assembled position.

Along opposite lateral edges of the compression box 377, projecting rims 381 are provided which are engaged by the slot-shaped suspension members 382 of the juice box 383.

The juice box shown in the Figs. 18, 21 and 22 is provided at the upper end of its front face with a cut-out 384 in each of the opposite walls 385 of the box. These cut-outs serve for easily removably holding suspension pins 386 provided on opposite sides of the door member 387.

The inclined juice strainer shown in Figs 18 and 23 is composed of a plurality of inclined strainer rods 388 and provided along its frontal bottom edge with a plurality of transversally arranged horizontal strainer rods 389. These strainer rods 389 retain solid particles of the extracted objects and serve as a separating strainer for the juice.

As mentioned above, this strainer member is easily removable through the front opening of the juice box. For this purpose, the projecting handle members 390 of the strainer are provided with cut-outs 391 adapted to rest on the edge 392 of the wall 393 of the juice box firmly supporting the strainer. In order to prevent unintentional sliding of this strainer despite this support, an engaging projection 394 is provided at the rear edge of the strainer adapted to engage a corresponding slot forming projection 395 on the rear wall 396 of the juice box, as clearly shown in Fig. 18.

A receiver, not shown, for the juice coming out of the outlet opening 116 during the squeezing operation may be positioned on the portion 14a of base 14. When such receiver is removed after the squeezing operation is completed, there is usually drippings coming out of opening 116. Accordingly, means is provided for catching such drippings. To this end, a bracket 350 is mounted on a central portion of the curved front wall 24 of the front housing 11. The bracket 350 comprises a web portion 351 and a pair of parallel flanges 352 extending outwardly from the upper and lower ends of the web. The bracket is secured to the wall 24 by screws 353 extending through the web portion 351. The flanges 352 are formed with aligned openings 354. Received in the openings 354 are pivot pins 355 extending from either end of a rotatable cylindrical member 356 positioned between the flanges 352. The member 356 is formed with a transverse through opening 357. A support member 358 is mounted on the member 356. The same comprises a cylindrical rod 359 having one end passing through the opening 357 in member 356 and an offset portion 360 extending towards the web portion 351 of bracket 350. The other end of rod 359 terminates in a looped portion 361 which is in a plane angularly related to the axis of rod 359. The looped portion 361 is adapted to removably support a cup or other receptacle whose opening is vertically aligned with the opening 116 in the juice box 110 for receiving the drippings therefrom. It is apparent that when the receiver disposed on portion 14a of base 14 is removed, the support 358 is adapted to be swung in a clockwise direction about pivoted member 356 into position relative to the opening 116 to receive drippings from the same. The offset portion 360 of support 358 in abutting web 351 of bracket 350 acts as a positioning means for the support to properly align the receptacle thereon with opening 116.

It is understood that the foregoing arrangement for catching drippings may also be used in conjunction with juice box 261, shown in Figs. 11 to 16 with the cup supported by the member 358, aligned with opening 314 in the juice box.

It will thus be seen that there is provided a device in which the several objects of this invention are achieved, and which is well adapted to meet the conditions of practical use.

As various possible embodiments might be made of the above invention, and as various changes might be made in the embodiment above set forth or shown in the accompanying drawing, the same is to be interpreted as illustrative and not in a limiting sense.

It will be understood that each of the elements described above, or two or more together, may also find a useful application in other types of juice extractors, differing from the types described above.

While we have illustrated and described the invention as embodied in a motor operated continuous orange juicer, we do not intend to be limited to the details shown, since various modifications and structural changes may be made without departing in any way from the spirit of our invention.

Without further analysis, the foregoing will so fully reveal the gist of our invention that others can by applying current knowledge readily adapt it for various applications without omitting features that, from the standpoint of prior art, fairly constitute essential characteristics of the generic or specific aspects of this invention, and, therefore, such adaptations should and are intended to be comprehended within the meaning and range of equivalence of the following claims.

What we claim as new and desire to secure by Letters Patent is:

1. A juice extracting device, including the combination of an upwardly extending body member; a compression box open at its top, bottom and one end; means detachably securing said compression box to an upper portion of said body member with said open end in contact with a surface portion of said body member having an opening; a slidable compression member arranged within said compression box and slidable in a horizontal direction; an operating shaft arranged within said body member slidable in a horizontal direction and having a projecting end portion extending through the opening in said surface portion of said body member and through said open end into said compression box; means for detachably securing said compression member to the projecting end portion of said operating shaft; a juice box provided with a large opening in its front wall and with an opening in its top wall and arranged under said compression box with said opening in its top wall superimposed upon the opening in the bottom wall of said compression box; means detachably securing said juice box in such position to said compression box; and an inclined strainer member having an upper angularly bent portion and downwardly inclined strainer rods extending removably through the intermediate portion of said juice box and through said large opening in the front wall thereof, the bottom of said juice box having a juice outlet opening for removal of juice after passing through said strainer member, said large opening in the front wall of said juice box allowing the compressed solid parts of the extracted objects to leave said juice box after sliding down the inclined upper surface of said strainer member.

2. A juice extracting device including the combination of an upwardly extending body member; a compression box open at its top, bottom and one end; means detachably securing said compression box to an upper portion of said body member with said open end in contact with a surface portion of said body member having an opening; a slidable compression member arranged within said compression box and slidable in a horizontal direction; an operating shaft arranged within said body member slidable in a horizontal direction and having a projecting end portion extending through the opening in said surface portion of said body member and through said open end into said compression box; means for detachably securing said compression member to the projecting end portion of said operating shaft; a juice box provided with a large outlet opening in its front wall and having an open top and disposed under said compression box with said open top registering with the open bottom of said compression box; means detachably securing said juice box in its position beneath said compression box; an inclined strainer member comprising inclined strainer rods removably mounted in said juice box and extending longitudinally within said juice box and through said large outlet opening in the front wall thereof, the bottom of said juice box having a juice outlet opening for removal of juice after passing through said strainer member, the said large outlet opening in the front wall of said juice box allowing the compressed solid parts of the extracted objects to leave said juice box after sliding down the upper surface of said inclined strainer member; and a door member freely swingably suspended near the upper front edge of said juice box so as to hang in vertical direction and normally close said large outlet opening in said front wall of said juice box.

3. A juice extracting device including the combination of an upwardly extending body member; a compression box open at its top, bottom and one end; means detachably securing said compression box to an upper portion of said body member with said open end in contact with a surface portion of said body member having a corresponding opening; a slidable compression member arranged within said compression box and slidable in a horizontal direction; an operating shaft arranged within said body member and axially slidable in a horizontal direction and having a projecting end portion extending through the opening in said surface portion of said body member and through said open end into said compression box; means detachably securing said compression member to the projecting end portion of said operating shaft; a juice box provided with a large outlet opening in its front wall and having an open top arranged under said compression box with said open top registering with the open bottom of said compression box; cooperating horizontal tongue and groove means disposed along two opposite lateral edges of said bottom wall of said compression box and said open top of said juice box for detachably securing said juice box to said compression box; an inclined strainer member removably disposed within said juice box and extending throughout the same and through said large outlet opening in the front wall thereof; said juice box having a juice outlet opening at the bottom for removal of juice after passing through said strainer member, outlet opening in the front wall of said juice box allowing the compressed solid parts of the extracted objects to leave said juice box after sliding down the upper surface of said inclined strainer member; and a door member freely swingably suspended near the upper front edge of said juice box so as to hang in vertical direction and normally close said large outlet opening in said front wall of said juice box.

4. A juice extracting device including the combination of an upright body member; a compression box open at its top, bottom and one end; readily released means for detachably securing said compression box to said body member with said open end in contact with a surface portion of said body member having a corresponding opening; a slidable compression member arranged within said compression box and slidable in a horizontal direction; an operating shaft arranged within said body member and axially slidable in a horizontal direction and having a projecting end extending through the opening in said surface portion of said body member and through said open end into said compression box; readily released means detachably securing said compression member to the projecting end portion of said operating shaft; a juice box provided with a large outlet opening in its front wall and having an open top and disposed under said compression box with said open top registering with the open bottom of said compression box; an inclined strainer member removably disposed within said juice box and extending through said large outlet opening thereof; the bottom of said juice box having a juice outlet opening for removal of juice after passing through said strainer member, said large outlet opening in the front wall of said juice box allowing the compressed solid parts of the extracted objects to leave said juice box after sliding down the upper surface of said inclined strainer member; and a door member freely swingably suspended near the upper front edge of said juice box so as to hang in vertical direction and normally close said large outlet opening in the front of said juice box.

5. A juice extracting device including the combination of an upwardly extending body member; a compression box open at its top, bottom and one end; means detachably securing said compression box to said body member with said open end in contact with a surface portion of said body member having an opening; a slidable compression member arranged within said compression box and slidable in a horizontal direction; an operating shaft arranged within said body member and axially slidable in a horizontal direction and having a projecting end portion extending through the opening in said surface portion of said body member and through said open end into said compression box; means for detachably securing said compression member to the projecting end portion of said operating shaft; a juice box having an open top and disposed under said compression box with said open top registering with the open bottom of said compression box; the bottom of said juice box having a juice outlet opening, the front wall of said juice box having a large outlet opening allowing compressed solid parts of extracted objects to leave said juice box; means detachably securing said juice box in its position beneath said compression box; an inclined strainer member arranged within said juice box and extending into said large outlet opening in said front wall so as to guide compressed solid parts through the same; holding means near the lower front edge of said inclined strainer member providing a threshold support for the same within said juice box in inclined position with said lower front end thereof extending substantially to the lower edge of said large outlet opening; said strainer comprising a plurality of parallel inclined strainer rods extending in longitudinal direction of said inclined strainer member from the upper end to a point spaced from said lower front edge thereof, and a plurality of parallel horizontal strainer rods extending in transverse direction with respect to said inclined strainer member within said lower front edge thereof and occupying a distinct area in addition to that occupied by said inclined strainer rods.

SIGMUND MOREY.
SECONDO L. CASELLA.

REFERENCES CITED

The following references are of record in the file of this patent:

UNITED STATES PATENTS

| Number | Name | Date |
|---|---|---|
| 808,861 | Mosteller | Jan. 2, 1906 |
| 1,128,733 | Steinbach | Feb. 16, 1915 |
| 1,641,245 | Agobian | Sept. 6, 1927 |
| 1,782,273 | Riemann | Nov. 18, 1930 |
| 1,958,570 | Flegel | May 15, 1934 |
| 2,265,409 | Verbrugge | Dec. 9, 1941 |
| 2,311,565 | Nelson | Feb. 16, 1943 |
| 2,358,841 | Walker | Sept. 26, 1944 |
| 2,454,256 | Myers | Nov. 16, 1948 |